(12) United States Patent
Addis

(10) Patent No.: US 7,000,923 B2
(45) Date of Patent: Feb. 21, 2006

(54) QUICK BUILD BRUSH SEALS

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/754,955

(22) Filed: Jan. 9, 2004

(65) Prior Publication Data

US 2005/0151323 A1 Jul. 14, 2005

(51) Int. Cl.
*F16J 15/447* (2006.01)
(52) U.S. Cl. ..................................... 277/355
(58) Field of Classification Search .................. 277/355
See application file for complete search history.

(56) References Cited

U.S. PATENT DOCUMENTS

| | | | |
|---|---|---|---|
| 5,066,024 A | | 11/1991 | Reisinger et al. |
| 5,630,590 A | | 5/1997 | Bouchard et al. |
| 5,704,760 A | | 1/1998 | Bouchard et al. |
| 6,168,162 B1 | | 1/2001 | Reluzco et al. |
| 6,318,728 B1 | | 11/2001 | Addis et al. |
| 6,808,179 B1 * | | 10/2004 | Bhattacharyya et al. .... 277/348 |
| 2002/0130469 A1 * | | 9/2002 | Kono .......................... 277/355 |
| 2003/0160392 A1 | | 8/2003 | Szymbor et al. |
| 2003/0178778 A1 * | | 9/2003 | Szymbor et al. ............ 277/355 |
| 2003/0201608 A1 | | 10/2003 | Addis |
| 2004/0000761 A1 * | | 1/2004 | Addis .......................... 277/355 |

FOREIGN PATENT DOCUMENTS

| | | |
|---|---|---|
| DE | 39 07 614 A1 | 9/1990 |
| EP | 0 293 140 A2 | 11/1988 |
| EP | 1 241 384 | 9/2002 |
| EP | 1 347 218 A2 | 9/2003 |

OTHER PUBLICATIONS

PCT International Search Report (ISR) issued in PCT/US2004/035650, on Feb. 28, 2005.

* cited by examiner

*Primary Examiner*—Alison K. Pickard
(74) *Attorney, Agent, or Firm*—Brian J. Hamilla

(57) ABSTRACT

A brush seal including a back plate, side plate and bristle ring is disclosed wherein the brush seal is secured together entirely through the use of removable fasteners. The back plate may be provided with a circumferential lip thereby providing a surface against which the head of a fastener can be used to compress the back plate against the side plate and thus capture the bristle ring therebetween. The brush seal can thereby be manufactured from disparate materials which could not be manufactured if welding were required.

23 Claims, 4 Drawing Sheets

QUICK BUILD BRUSH SEALS

FIELD OF THE INVENTION

The present disclosure generally relates to seals and, more specifically, relates to brush seals.

BACKGROUND OF THE DISCLOSURE

Seals are common mechanical devices used when it is desired to prevent flow of fluid through a given space. One type of seal, referred to as a brush seal, uses a plurality of bristles held in place across the area to be sealed. An advantage of a brush seal is its inherent ability to move and yet maintain a seal as surfaces forming the area to be sealed are moving themselves.

One environment in which brush seals are commonly used is within gas turbine engines of the type used for providing propulsion to aircraft, auxiliary power to aircraft or other moving vessels, or in land based power generation situations. Brush seals used within gas turbine engines are used to prevent leakage of working medium air out of the main flow path of the engine. Minimization of such leakage is important since any leakage degrades the efficiency of the engine thereby increasing the fuel consumption of the engine and cost of operation of the engine. Moreover, pressurized air or combustion gases which escape from the main flow path of the engine are at elevated temperatures and may contact engine components having limited tolerance for such temperatures. For example, the brush seal may be used between a gap formed between a stationary part such as a diffuser, engine casing or stator, and a rotating part, such as a turbine blade, shaft, or rotor.

While effective, it is nonetheless necessary to replace such brush seals over time. For example, such replacement may be scheduled after a given number of hours of operation. However, conventionally manufactured brush seals are welded assemblies, which necessarily make removal difficult. In addition, as the components forming the brush assembly are welded together, replacement of individual components comprising the assembly is not possible. As a result, the entire assembly needs to be replaced at significant cost, not only in terms of material but in labor and down time of the engine as well.

Recently, it has been known to manufacture brush seals using clips or fasteners to hold the assembly together. These two are effective, but require additional machining under relatively close tolerances, thus increasing the cost of production.

SUMMARY OF THE DISCLOSURE

In accordance with one aspect of the disclosure, a brush seal is disclosed which may comprise a side plate, a back plate, a bristle ring, and a plurality of fasteners. The back plate may include a circumferential lip, while the bristle ring may be disposed between the side plate and the back plate. The plurality of fasteners may secure the back plate to the side plate, with each fastener including a head engaging only a perimeter of the back plate and pressing the back plate and bristle ring against the side plate.

In accordance with another aspect of the disclosure, a method of forming a brush seal is disclosed which may comprise positioning a bristle ring proximate a side plate, overlaying a back plate atop the bristle ring, and securing the back plate to the side plate using fasteners engaging only a perimeter of the back plate.

In accordance with another aspect of the disclosure, a modular brush seal is disclosed which may comprise a side plate, a back plate, a bristle ring secured between the side plate and back plate, and means for removably securing the side plate, back plate, and bristle ring together without penetrating the bristle ring and one of the side plates and back plate.

In accordance with another aspect of the disclosure, a gas turbine engine is disclosed which may comprise a compressor section, a combustion section, a turbine section, a shaft assembly, an engine casing, and a brush seal. The brush seal includes a side plate, a back plate having a perimeter, a bristle ring disposed between the side plate and the back plate, and a plurality of fasteners securing the back plate to the side plate. Each fastener includes a head engaging only the back plate perimeter and pressing the back plate and bristle ring against the side plate.

These and other aspects and features of the disclosure will be become more apparent upon reading the following detailed description when taken in conjunction with the accompanying drawings.

Figure 1:
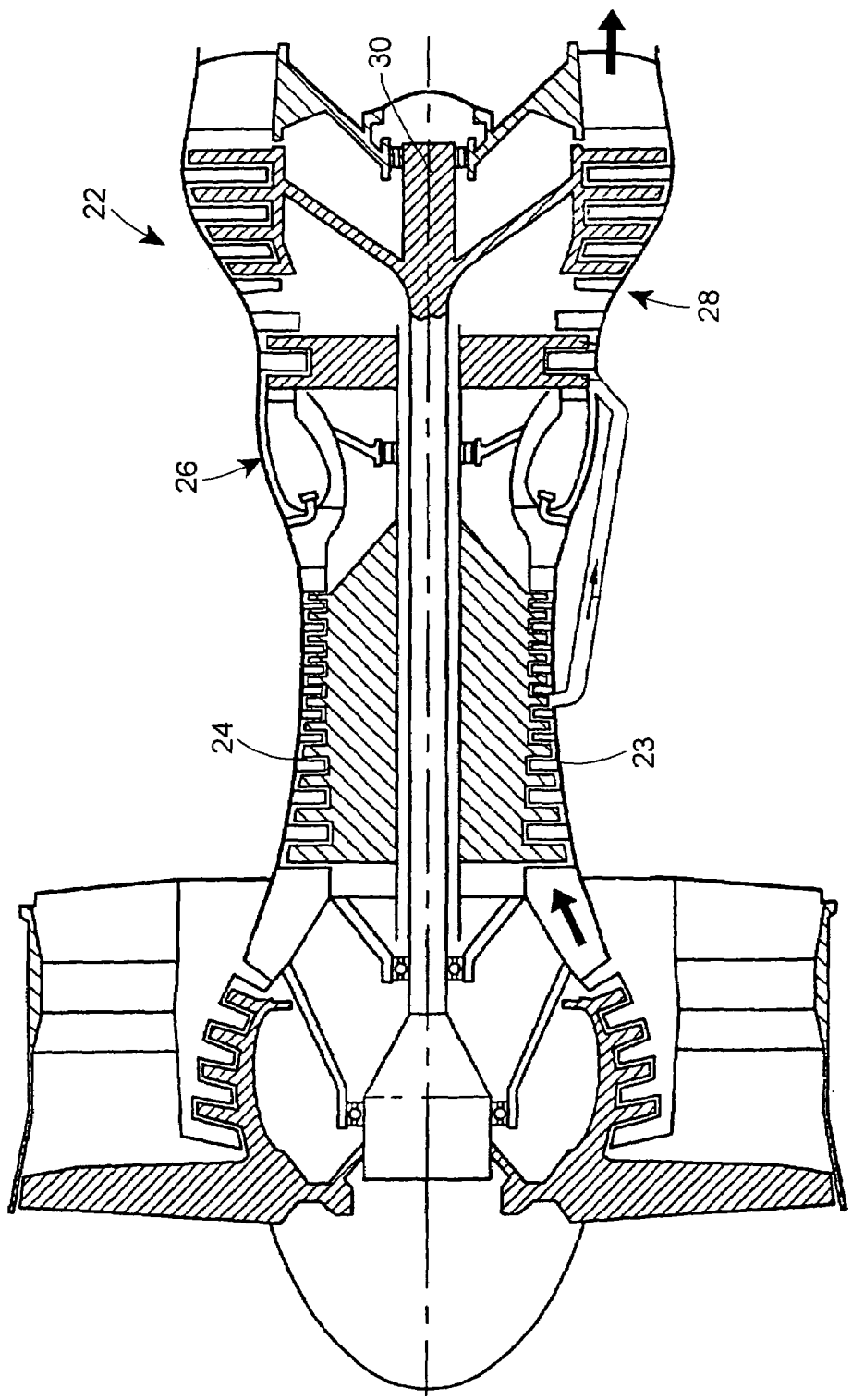
FIG. 1 is a sectional view of a gas turbine engine within which a brush seal assembly constructed in accordance with the teachings of the disclosure is installed.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents following within the spirit and scope of the disclosure as defined by the appended claims.

DETAILED DESCRIPTION OF THE DISCLOSURE

Figure 2:
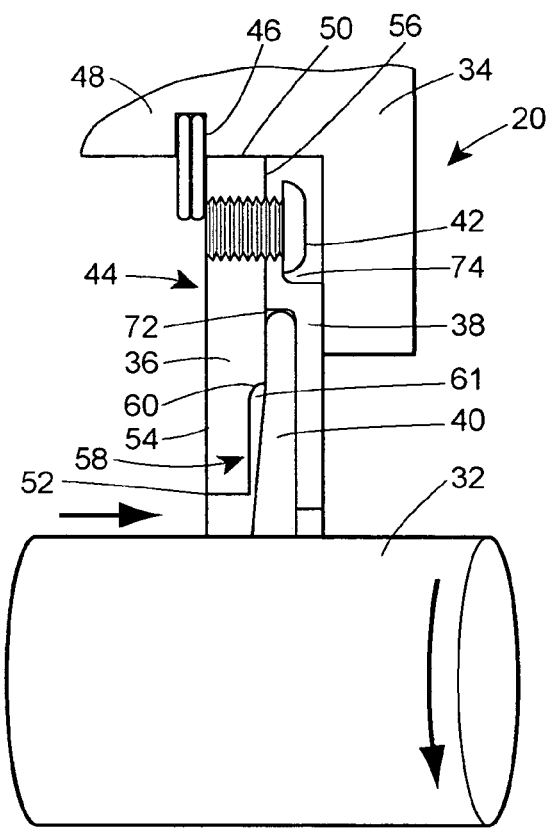
FIG. 2 is sectional view of a brush seal assembly constructed in accordance with the teachings of the disclosure.
Figure 3:
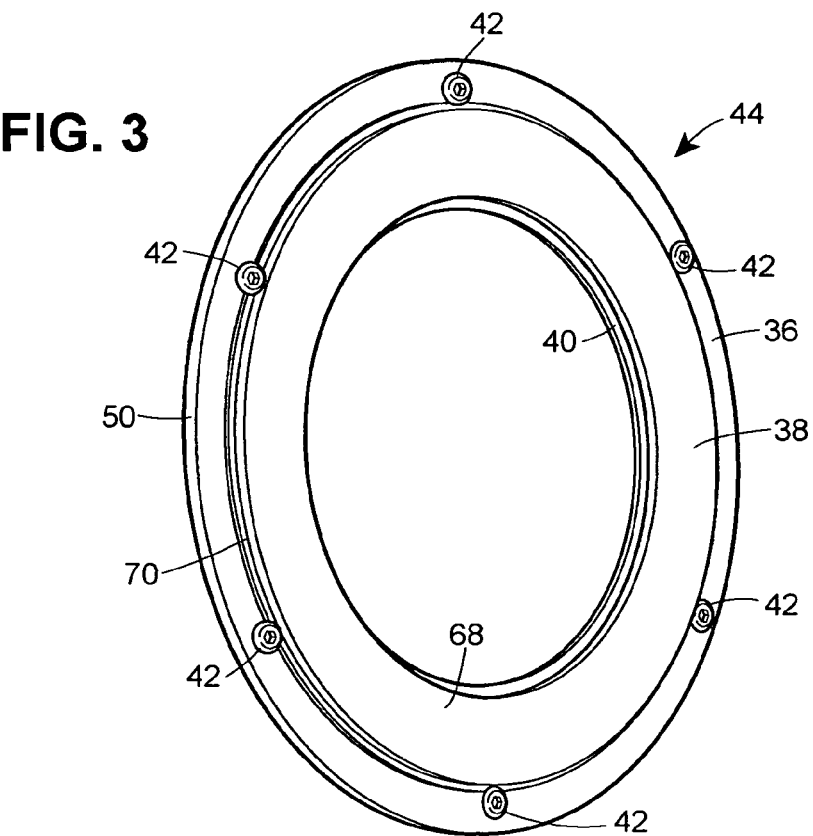
FIG. 3 is a perspective view of the brush seal of FIG. 2.
Figure 4:
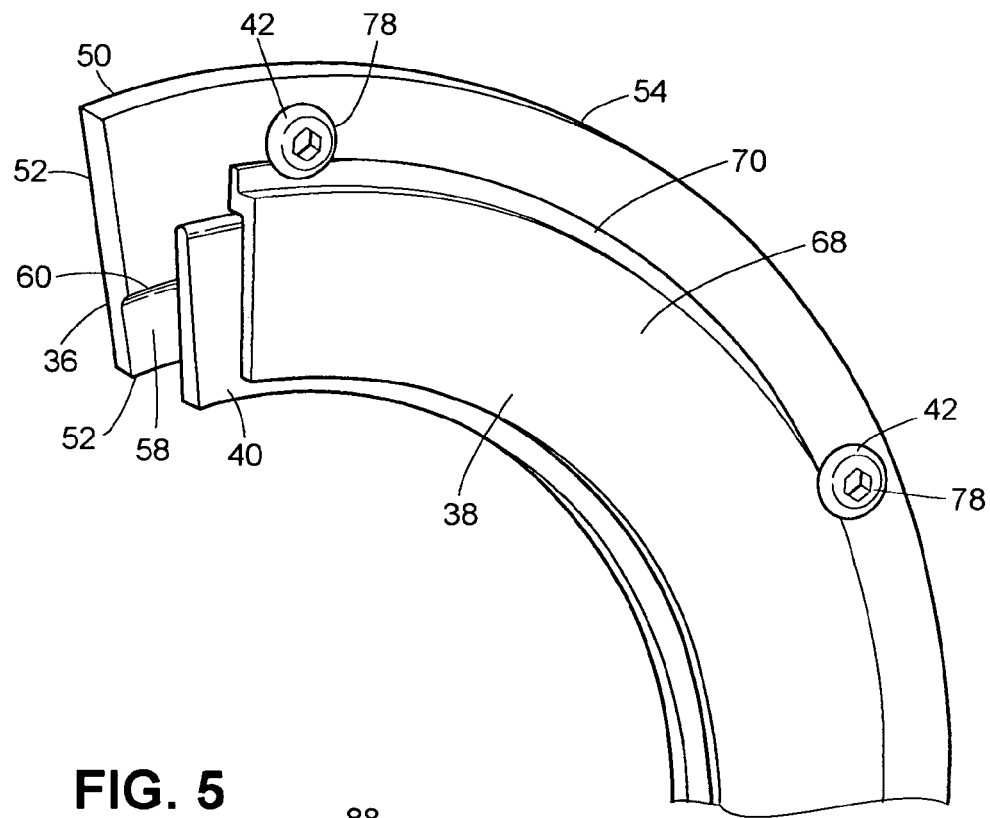
FIG. 4 is a front cut-away view of the brush seal of FIG. 3.
Figure 5:
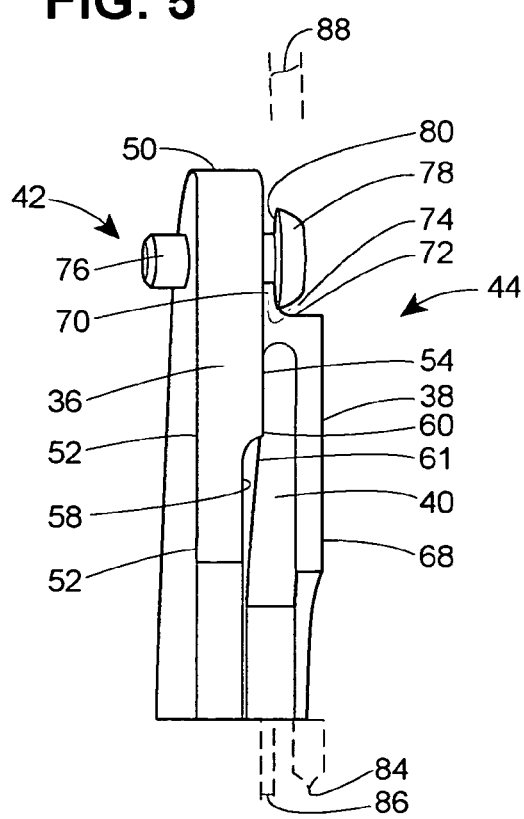
FIG. 5 is an enlarged sectional view of the brush seal of FIG. 4 taken along line 5—5 of FIG. 4.
Figure 6:
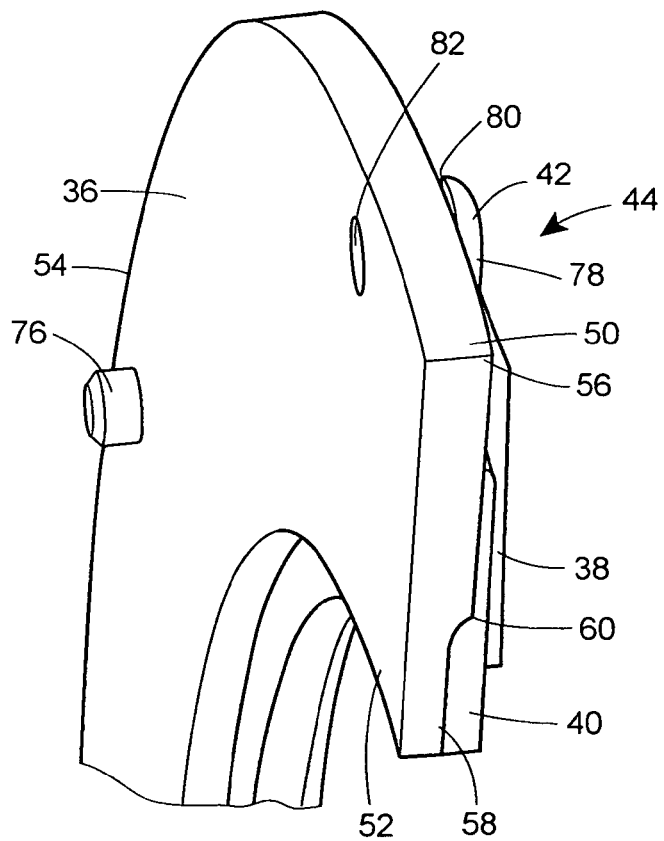
FIG. 6 is a rear cut-away view of the brush seal of FIG. 3.

Referring now to the drawings and with specific reference to FIGS. 1 and 2, a brush seal constructed in accordance with the teachings of the disclosure is generally referred to by reference numeral 20. The brush seal 20 could be used within a gas turbine engine 22, but it is to be understood that the brush seal could also be employed in any number of different environments and that the gas turbine engine 22 is depicted, and will be described below, mainly for the purposes of illustration and context.

As would be readily understood by one of ordinary skill in the art, the gas turbine engine 22 includes an engine casing 23, a compressor section 24, a combustion chamber 26, and a turbine section 28. In terms of a simplified overview, the compressor section 24 draws in ambient air and pressurizes that air for introduction to the combustion chamber 26. Within the combustion section 26, fuel is injected and ignited with the resulting heat and combustion gases being directed into the turbine section 28. As the turbine section 28 and compressor section 24 are mounted on a common shaft assembly 30, rotation of the turbine section 28 causes the compressor section 24 to rotate as well, thereby perpetuating the engine cycle of operation.

One premise upon which a gas turbine engine 22 operates is the effective compression of fluid and release of that fluid to a turbine section. Accordingly, any fluid leakage is necessarily costly to the efficacy of the engine. A number of points within the gas turbine engine must therefore be sealed to minimize that leakage to the greatest extent possible. One example of an area where such sealing is desirable is depicted in the gas turbine engine 22 between a rotor 32 of the compression section 24 and its surrounding stator 34 as shown in FIG. 2. Again, this is provided simply for the purposes of illustration and it is to be understood that the brush seal 20 could be used in any number of different locations within the gas turbine engine 22 such as, but not limited to, between two stationary components of the engine 22, as well as a number of applications other than the gas turbine engine 22.

Referring to FIGS. 2–6, the brush seal 20 may include a side plate 36, a back plate 38, and a bristle ring 40 positioned therebetween. As it will be discussed in further detail herein, it will be noted that a plurality of fasteners 42 are used to secure the three components: side plate 36, back plate 38, and bristle ring 40, together. The resulting brush seal assembly 44 is then mounted on the stator 34, or whatever other structure is to be sealed. In the depicted embodiment, a split ring 46 is used to wedge the brush seal assembly 44 against a circumferential wall 48 of the stator 34 but is to be understood that any number of other different forms of mechanical fasteners could be employed as well including, but not limited to, L-shaped rings, threaded fasteners, rivets, clamping assemblies, and the like.

With specific reference to the side plate 36, it is shown in each of FIGS. 2–6 as being substantially annular in shape with an outer circumference 50, an inner circumference 52, a first side surface 54, and a second side surface 56. The first side surface 54 is substantially planar, while the second side surface 56 includes a scalloped portion 58 of reduced thickness thereby forming a pinch point 60. The scalloped portion 58 forms a void 61 which enables the bristle ring 40 some degree of movement to facilitate operation, while the pinch point 60 ensures a robust joint between the three main components 36, 38, 40. The scalloped portion 58 serves as a windage cover in that it protects bristle ring 40 from the effects of windage, while still enabling the bristles to flare slightly at the pinch point 60.

Figure 7:
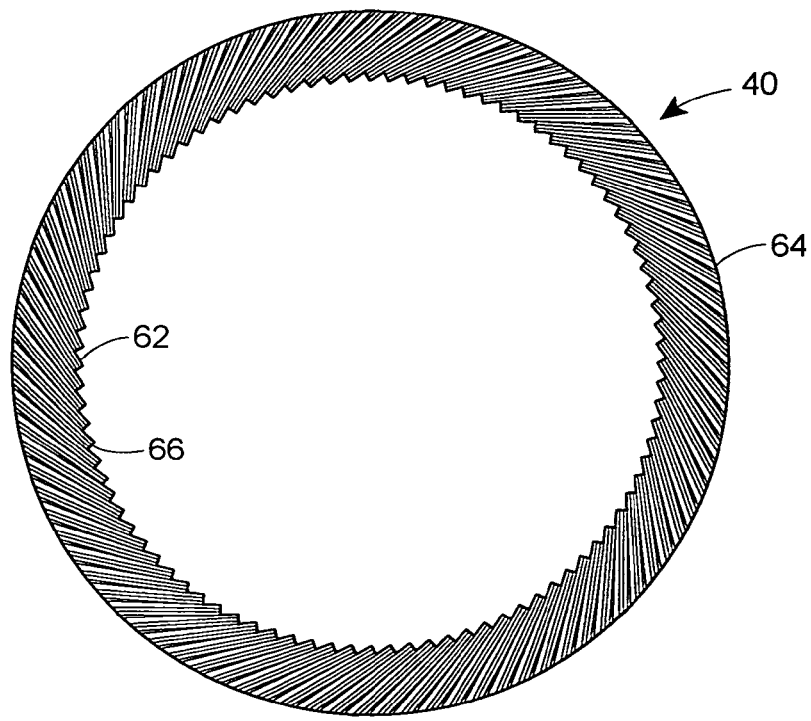
FIG. 7 is a plan view of a bristle ring constructed in accordance with the teachings of the disclosure.

With regard to the bristle ring 40, it is shown best in FIG. 7 to include a plurality of bristles 62 welded to form an outer perimeter 64. More specifically, the bristles 62 are typically provided in the form of individual tufts 66 of bristles which are then individually welded together with the weld therebetween forming the perimeter 64. Accordingly, the bristles 62 are typically manufactured of metal such as, but not limited to, stainless steel or cobalt alloy. Depending upon the size of the area to be sealed, it is to be understood that a differently sized outer perimeter 64, as well as differently sized bristles 62 with the same size outer ring 64, can be employed. In alternative embodiments, a separate distinct outer hoop may be used, to which the tufts 66 are welded.

Referring again to FIGS. 2–6, the back plate 38 is shown to be substantially annular in shape, with a main annulus 68 from which radially, outwardly extends a perimeter or circumferential lip 70. As shown best in FIG. 2, the circumferential lip 70 and main annulus 68 provide a substantially stepped construction thereby forming an internal recess 72 and an external recess 74, the importance of which will be discussed in further detail herein. The bristle ring 40 should have a width greater than a width of the recess 72 to ensure a positive screw clamping force on the bristle ring 40 and thus prevent liberation by maintaining the seal pinch point 60.

In terms of manufacturability, the brush seal assembly 44 may be constructed by providing the side plate 36, positioning the bristle ring 40 atop the side plate 36, laying the back plate 38 atop the bristle ring 40, such that the bristle ring 40 resides within the internal recess 72, and securing the side plate 36, back plate 38, bristle ring 40 together using the plurality of fasteners 42. More specifically, as shown best in FIG. 5, each of the plurality of fasteners 42 may include a shaft 76, as well as a head 78. Any number of different types of fasteners can be used, including but not limited to cap screws. With such fasteners, it will be noted that the head 78 and shaft 76 form an internal shoulder 80 which can be used to engage the circumferential lip 70 of the back plate 38 to secure the brush seal assembly 44 together. More specifically, as the side plate 36 is provided with a plurality of apertures 82, when it is desired to assemble the brush seal assembly 44, once each of the components are atop one another as indicated above, the fasteners 42 can simply be threaded into the apertures 82 until the shoulders 80 of the heads 78 press against the circumferential lip 70 thereby compressing the back plate 38 against the side plate 36 and in turn compressing the bristle ring 40 therebetween. If desired, the fasteners 42 may be tacked welded to the back plate 38. It may be necessary to machine the non-headed end of the fastener to be flush with side plate 36. This will eliminate interference with the retention device used.

One significance of the external recess 74 is that the heads 78 of the fasteners 42 can be easily positioned therein for space saving purposes. In other words, it will be noted that the main annulus 68 of the back plate 38 includes a first width 84, that the circumferential lip 70 includes a second width 86, and that the fastener head 78 include a third width 88. The second width 86 plus the third width 88 is substantially less than the first width 84, thereby fully recessing the fastener head 78 into the brush seal assembly 44 and thus providing a brush seal assembly 44 of substantially reduced overall width without using specialized and more expensive countersinks or the like.

Such construction provides a number of advantages over previous brush seals. For example, by providing a brush seal assembly 44 which is secured together entirely through the use of removable fasteners 42, production time is greatly reduced in that welding is not necessary. In addition, when it is desired to replace a bristle ring 40, for example at periodic maintenance intervals, or after a given number of operational hours, the fasteners 42 can simply be removed thereby freeing the bristle ring 40 for insertion of a replacement ring 40.

An additional benefit is the modularity of the assembly construction. Again, since the individual components are not fixedly attached, but rather movably attached through the use of threaded fasteners 42, if components of differing materials which would not lend themselves to attachment by way of welding or the like, are to be used, the foregoing construction allows for such provision. Again, since the entire assembly 44 is secured together through the use of threaded fasteners, if a plastic side plate 36, back plate 38 or bristle ring 40 is to be used, it can be, which is an option that would not be a possibility if welding were necessary. As a result, non-compatible metals, plastic-metal combinations, and high temperature carbon-based materials, among others, may be used.

Similarly, since the entire assembly 44 can be disassembled, bristle rings 40 of differing materials or diameters, as well as side plates 76 and back plates 38 of differing diameters and other dimensions can be easily interchanged. Such a feature may be particularly advantageous during rig, engine, or brush seal developmental testing.

A further advantage provided by the foregoing construction can be attributed, again to the use of fasteners 42, but also to the use of the circumferential lip 70. As opposed to a construction wherein apertures need to be provided within the back plate 38, and closely held tolerances need to be met to ensure the back plate apertures align with the side plate apertures 82, with the construction of the present disclosure, the back plate 38 can simply be laid atop the side plate 36 in any rotational position, and the fasteners 42 can then be used to secure the assembly together in a quick and repeatable fashion. More specifically, as was indicated above, the head 78 and shoulder 80 secure the assembly together by compressing the back plate 38 against the side plate 36 thereby capturing the bristle ring 40 therebetween. Such construction greatly reduces manufacturing and labor costs associated with such a seal.

From the foregoing, it will be appreciated that the present disclosure provides a brush seal of significant advantages over those currently provided in the market place and heretofore known.

What is claimed is:

1. A brush seal, comprising:
a side plate;
a back plate having a perimeter;
a bristle ring disposed between the side plate and the back plate; and
a plurality of fasteners securing the back plate to the side plate, each fastener including a head, the head engaging the back plate perimeter and pressing the back plate and bristle ring against the side plate, each of the plurality of fasteners being located radially outward of an outermost edge of the back plate.

2. The brush seal of claim 1, wherein the side plate is annular in shape and includes a plurality of apertures adapted to receive the plurality of fasteners.

3. The brush seal of claim 1, wherein the back plate includes a recess for receipt of the bristle ring.

4. The brush seal of claim 1, wherein the side plate includes a recess forming a pinch point.

5. The brush seal of claim 1, wherein the plurality of fasteners are threaded.

6. The brush seal of claim 1, wherein the plurality of fasteners are cap screws.

7. The brush seal of claim 1, wherein at least one of the side plate, back plate, and bristle ring is made of a material different than a material from which the other two of the side plate, back plate, and bristle ring are made.

8. The brush seal of claim 7, wherein at least one of the side plate, back plate, and bristle ring is made of metal, and at least one of the side plate, back plate, and bristle ring is made of plastic.

9. A method of forming a brush seal, comprising:
positioning a bristle ring proximate a side plate;
overlaying a back plate atop the bristle ring; and
securing the back plate to the side plate using fasteners engaging a perimeter of the back plate, the fasteners being located radially outward of an outermost edge of the back plate.

10. The method of claim 9, wherein the back plate is secured to the side plate using threaded fasteners.

11. The method of claim 10, wherein each threaded fastener includes a head, each head clamping the back plate to the side plate.

12. The method of claim 11, wherein the back plate includes a reduced thickness lip, the fastener heads engaging the lip.

13. The method of claim 9, wherein the back plate includes a recess adapted to receive the bristle ring.

14. The method of claim 9, further including the step of mounting the brush seal in a gas turbine engine.

15. The method of claim 9, further including tack welding the fastener heads to the back plate and sideplate.

16. The method of claim 9, further including disassembling the brush seal by removing the fasteners, replacing at least one of the back plate, side plate and bristle ring, and reassembling the brush seal.

17. The method of claim 16, wherein the at least one of back plate, side plate, and bristle ring is plastic.

18. A gas turbine engine, comprising:
a compression section;
a combustion section;
a turbine section;
a shaft assembly connecting the compression section and the turbine section;
an engine casing surrounding the compression section, combustion section, turbine section, and shaft; and
a brush seal positioned between one of the compression section, combustion section and turbine section and one of the shaft and engine casing, the brush seal including a side plate, a back plate having a perimeter, a bristle disposed between the side plate and the back plate, and a plurality of fasteners securing the back plate to the side plate, each fastener including a head engaging the back plate perimeter and pressing the back plate and bristle ring against the side plate, each of the plurality of fasteners being located radially outward of an outermost edge of the back plate.

19. A modular brush seal, comprising:
a side plate;
a back plate;
a bristle ring secured between the side plate and the back plate; and
means for removably securing the side plate, back plate and bristle ring together without penetrating the bristle ring and one of the side plates and back plate, the means for remavably securing engaging only a perimeter of the back plate, the means for removably securing being radially outward of an outermost edge of the back plate; and
wherein the means for removably securing includes a plurality of threaded fasteners, wherein the plurality of fasteners each include a head.

20. The modular brush seal of claim 19, wherein the back plate perimeter has a first thickness and an adjoining annulus of the back plate has a second thickness, the first thickness plus a thickness of the fastener head being less than the second thickness.

21. The modular brush seal of claim 19, wherein the back plate includes a recess, the bristle ring being positioned within the recess.

22. The modular brush seal of claim 19, wherein the side plate, back plate and bristle ring are made of different materials.

23. The modular brush seal of claim 22, wherein at least one of the side plate, back plate and bristle ring is made of metal, and at least one of the side plate, back plate and bristle ring is made of plastic.

* * * * *